United States Patent [19]
Pricone et al.

[11] Patent Number: 5,156,863
[45] Date of Patent: * Oct. 20, 1992

[54] CONTINUOUS EMBOSSING BELT

[75] Inventors: Robert M. Pricone, Vernon Hills; Anthony J. Montalbano, Lake Barrington Shores, both of Ill.

[73] Assignee: Stimsonite Corporation, Niles, Ill.

[*] Notice: The portion of the term of this patent subsequent to Dec. 4, 2001 has been disclaimed.

[21] Appl. No.: 903,226

[22] Filed: Sep. 2, 1986

Related U.S. Application Data

[60] Continuation of Ser. No. 627,285, Jul. 2, 1984, abandoned, which is a division of Ser. No. 430,866, Sep. 20, 1982, Pat. No. 4,478,769.

[51] Int. Cl.$^5$ ............................................. B29C 59/04
[52] U.S. Cl. ................................. 425/363; 425/385
[58] Field of Search ................. 425/388, 363, 385; 204/9, 12, 13, 206, 281

[56] References Cited

U.S. PATENT DOCUMENTS

| | | | |
|---|---|---|---|
| 1,445,626 | 2/1923 | Kent | 264/293 |
| 1,555,840 | 10/1925 | Hanley | 204/12 |
| 1,668,390 | 5/1928 | Auman | 264/293 |
| 2,551,005 | 5/1951 | Johnson | 264/284 |
| 2,567,275 | 9/1951 | Colombo | 264/284 |
| 2,569,367 | 9/1951 | Bradner et al. | 204/13 |
| 3,170,974 | 2/1965 | Jacobs | 264/284 |
| 3,387,351 | 6/1968 | Roosen | 264/219 |
| 3,476,657 | 11/1969 | Lundquist | 204/9 |
| 3,704,175 | 11/1972 | MacKinney | 204/9 |
| 3,758,649 | 9/1973 | Frattarola | 264/1 |
| 3,799,859 | 3/1974 | Wallin | 204/9 |
| 3,882,202 | 5/1975 | Hannan et al. | 264/1 |
| 3,935,359 | 1/1976 | Rowland | 428/172 |
| 4,280,978 | 7/1981 | Dannheim | 264/156 |
| 4,318,794 | 3/1982 | Adler | 204/13 |
| 4,326,928 | 4/1982 | Dugan | 204/9 |
| 4,396,465 | 8/1983 | Newell | 204/13 |
| 4,486,363 | 12/1984 | Pricone et al. | 264/1.9 |

*Primary Examiner*—Willard E. Hoag
*Attorney, Agent, or Firm*—Jones, Day, Reavis & Pogue

[57] ABSTRACT

An optically precise endless embossing belt for making retroreflection materials having projections with 90° corners is provided by the instant invention.

11 Claims, 5 Drawing Sheets

CONTINUOUS EMBOSSING BELT

CROSS-REFERENCES TO RELATED APPLICATION

This is a continuation of application Ser. No. 06/627,285 filed Jul. 2, 1984, now abandoned which is a division of application Ser. No. 06/430,866 filed Sep. 20, 1982, which is now U.S. Pat. No. 4,478,769.

BACKGROUND OF THE INVENTION

1. Field of the Invention

The invention is directed to the field of continuous embossing of sheeting or webs and more particularly to methods and apparatus of producing large scale, flexible, and generally cylindrical embossing tools to emboss continuous plastic webs or the like with a highly accurate pattern of cube-corners useful in the manufacture of retroreflective sheeting.

2. Description of the Prior Art

Some presently employed techniques for the production of retroreflective sheeting include the casting of cube corners on cylindrical drums, followed by an application of secondary material, whereby the cube corner elements are adhered to a different back-up material. (e.g., U.S. Pat. No. 3,935,359).

Sequential embossing of cube corner type sheeting material has been suggested by using a series of tooled plates and molds. The web of material is embossed on one stroke of the press and then indexed to the next station for a further pressing operation (U.S. Pat. No. 4,244,683). This process, while operating on a continuous strip of material, is only sequential in nature and has all of the economic and manufacturing deficiencies inherent in such a process. Moreover, to be economically feasible, the width of film or sheeting to be produced, such as 48", requires extensive mold handling capability not contemplated by the Rowland '683 structure and process.

Small, rigid cylindrical rolls also are available for the general continuous embossing of webs of sheet material but, because of the high degree of optical accuracy required in reproducing cube corner elements, this technique has not been used to produce continuous sheeting.

Continuous belt type embossing tools also have been disclosed for embossing non-optically critical patterns in thermoplastic or other materials, such as shown in Bussey et. al., U.S. Pat. No. 3,966,383. It also is well known in the cube-corner reflector art to use electroformed tools for producing mold elements. However, the relatively small area encompassed by the typical reflective area permits the easy separation of the electroformed part from its "master" or from pins. To produce a tool required to emboss large areas of sheet, it would be possible to assemble larger and longer groups of masters, but minute seams would be found at the junction lines. Those seams in a final tool could produce stress risers, flash or fins, leaving the assembled tool with possible fatigue areas. In accordance with the present invention, the pieces are reproduced by eliminating the "fin" or seam and then by producing a cylindrical mother and electroforming internally of the tool mother. A problem then encountered is the removal of the cylindrical electroformed tool from the tool mother because of the very accurate but tightly interfitting male and female faces. The present invention discloses techniques and apparatus for producing a cylindrical embossing a tool by electroforms; and a method of separating the finished tool from the cylindrical tool mother.

SUMMARY OF THE INVENTION

The present invention overcomes the difficulties noted with respect to prior art embossing tools by providing methods and apparatus for making large scale, flexible, generally cylindrical embossing tools for embossing highly accurate cube corner or other types of patterns requiring extremely accurate precision formations continuously upon a moving web of plastic or other suitable material.

One or more highly accurate optical quality master elements is cut into suitable substrates. Each master consists of a precision pattern which, in the specific disclosed embodiment, may take the form of tetrahedrons or the like formed when three series of parallel grooves are scribed into the substrate along each of three axes, each axis being spaced from the other two by 120°. Each master element has a series of marginal edges of a geometric figure, such as a triangle, rectangle, square, hexagon, etc. so that the masters can be placed in an abutting contiguous relationship without any gaps therebetween. The masters (or copies of the master) are combined in a cluster to provide a desired pattern in a fixture, and an electrofore strip is made of the cluster. The electroformed strip is thin and flexible and with a proper support could itself be used directly as an embossing or compression molding tool but in a non-continuous manner, such as the sequential type embossing disclosed in U.S. Pat. No. 4,244,683.

Alternately, a number of electroform copies can be made from a single master and these copies combined as a desired cluster in a fixture and an electroform strip made of such copies. This electroform strip also can be used as an embossing tool or in compression molding. In order economically to provide a continuous sheet of material, it is desirable to continuously emboss the thermoplastic substrate without indexing a plurality of molds. Method and apparatus for accomplishing this is disclosed in copending application Ser. No. 06/430,866, since issued as U.S. Pat. No. 4,478,769 on Oct. 23, 1984. That apparatus may utilize a tool of the type produced by the present invention, in which the tool pattern may be at least 48" wide and have a total circumference of 115".

When producing cube-corner sheeting, the high optical quality of the master required, permits only a relatively small master to be produced, such as 5" on a side. Accordingly, to produce an embossing tool of sufficient size to permit embossing of wide webs from the electroform produced from the electroform copy of the masters or the electroform copy of the copies of the ruled master, it is necessary to duplicate and enlarge the copies until a tool of the desired size is achieved.

It therefore is an object of the present invention to produce an improved embossing tool including novel techniques for assuring accuracy of the tool master.

It is another object of the invention to produce an embossing tool large enough to continuously emboss a wide web of material.

It is another object of this invention to produce a large scale, flexible, generally cylindrical embossing tool.

It is yet a further object of this invention to provide a novel method to produce an improved embossing tool for embossing cube-corner sheeting.

It is another object of the invention to provide a novel method of producing a large scale, flexible, seamless cylindrical embossing tool employing a plurality of individually formed masters, replicating such masters and through successive combination and replication of such masters and the resultant copies, produce such an embossing tool.

A further object of the invention is to provide a novel method of producing a large scale, flexible, seamless cylindrical embossing tool employing a single master, replicating and combining such and resultant copies to produce such embossing tool, and a method of separating such large tool from a cylindrical tool mother.

Other objects and features of the invention will be pointed out in the following description and claims and illustrated in the accompanying drawings which disclose, by way of example, the principles of the invention and the best modes which have been contemplated for carrying them out.

BRIEF DESCRIPTION OF THE DRAWINGS

In the drawings in which similar elements are given similar reference characters.

DESCRIPTION OF THE REFERRED EMBODIMENTS

Figure 2:
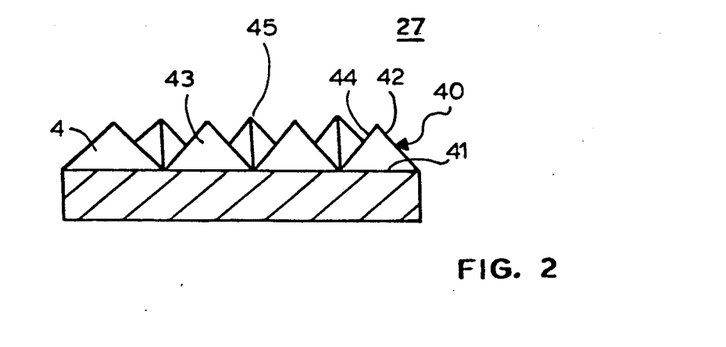
FIG. 2 is an elevational view of the master of FIG. 1A, partly in section, taken along the line 2—2 in FIG. 1A.
Figures 3, 7, 12:
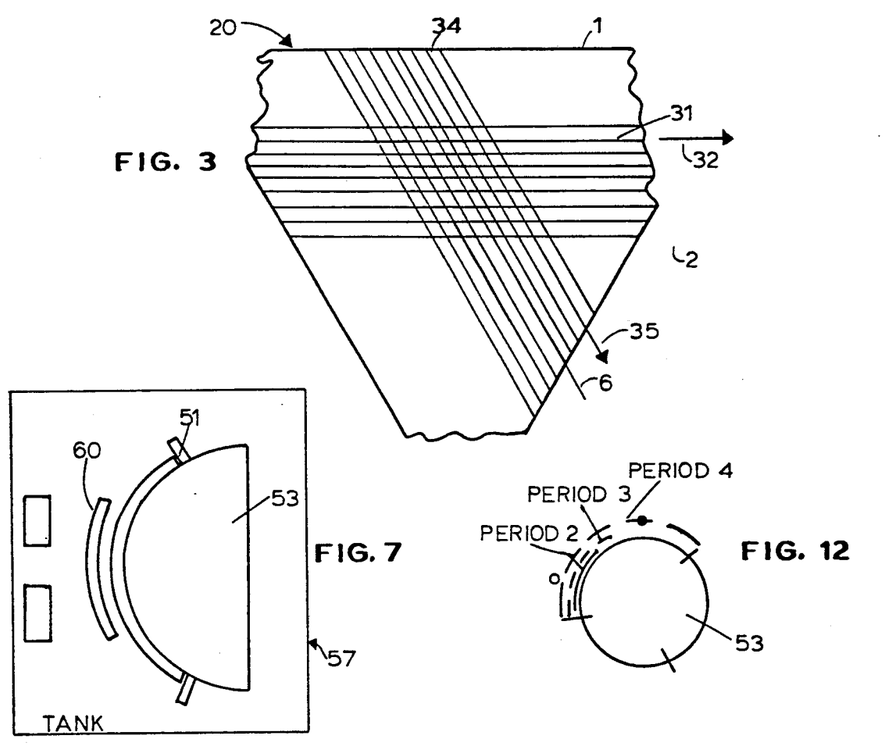
FIG. 3 is a fragmentary top plan view of a partially completed master.
FIG. 7 is a schematic representation of the technique employed to create semi-cylindrical segments according to the present invention.
FIG. 12 is a representational plan view of a tank and shield demonstrating expansion of the shield's position during electroforming of the cylindrical tool master.
Figure 4:
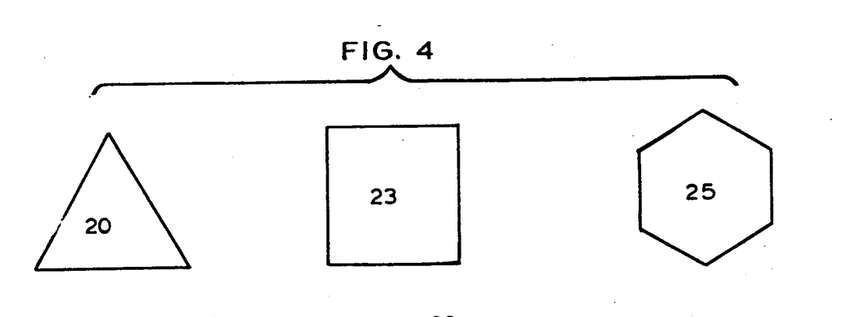
FIG. 4 is a top plan view of a series of blank elements having different geometric shapes suitable for use as masters in accordance with the method of the invention.
Figure 5:
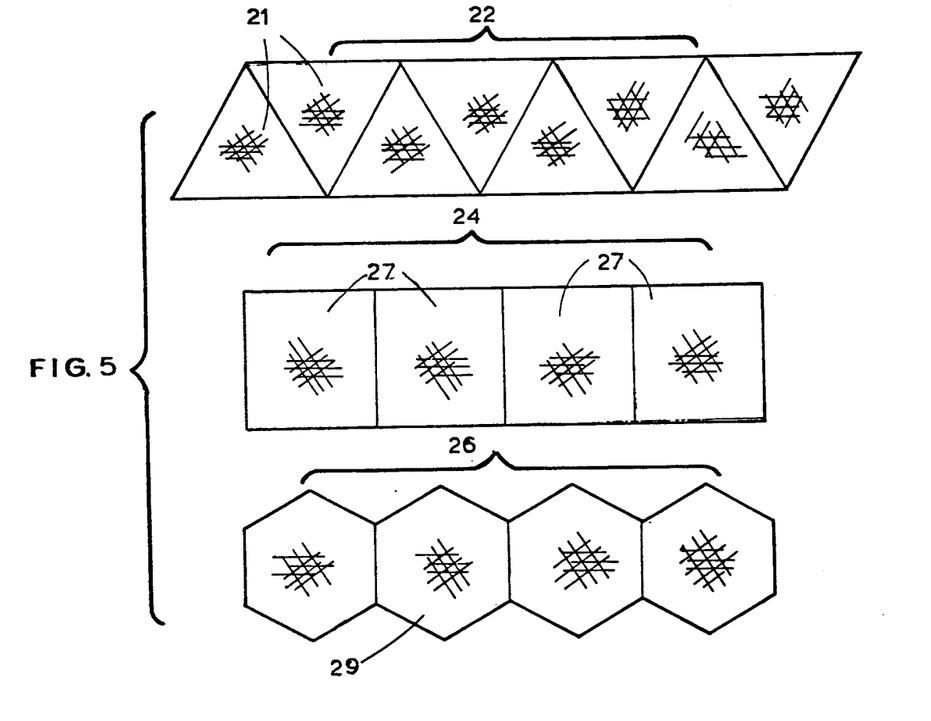
FIG. 5 is a top plan view of the ruled masters formed of the blanks of FIG. 4, indicating how each of the respective types of ruled masters can be organized into a cluster with like masters to provide contiguous and continuous surfaces without gaps therebetween.

Turning now to FIGS. 1 to 5, there are shown various aspects of a blank element which is the basic building element for producing large scale, flexible, seamless cylindrical embossing tools according to the process of the present invention. The overall length and width of the element which becomes the ruled master usually is determined by the type of ruling device used to cut the master, and the element may be on the order of one to seven inches on a side. The outline shape of the element, as is shown in FIG. 4, may be triangular, as at 20, square as at 23, or hexagonal as at 25. The three shapes of the elements as shown in FIG. 4, as well as others, for example, the rectangle or the octagon, or other shapes and combinations also may be employed, but preferably the shape chosen should be a regular geometric figure which can be combined with other similar figures without permitting a gap to exist between adjacent sides of such figures. FIG. 5 illustrates how a number of triangular ruled masters 21 can be arranged into a cluster 22. Similarly a number of square ruled masters 27 and hexagonal masters 29 can be positioned to form clusters 24 and 26 respectively.

Each element such as 20 is chosen of a thickness such that it remains rigid during the removal of metal while undergoing generation of the ruled master and during subsequent electro-forming processes. The element preferably is of aluminum or electro-deposited copper.

Ruling machines used in forming scribing grooves to provide a ruled master to make a tool for cube-corner sheeting are well known in the art. Such machines are capable of positioning the workpiece and a cutter within the optical tolerances necessary to scribe the grooves to optical requirements including proper depth, angle, spacing and a mirror finish. Typical groove spacings to form cube-corner type reflector elements range from 0.003 to 0.0065 inches.

As used herein, the phrases "cube-corner", or "trihedral" or "tetrahedron" are art recognized terms for retroreflective elements comprising three mutually perpendicular faces, without reference to the size or shape of the faces or the portion of the optical axis of the cube-corner element so formed. Stamm U.S. Pat. No. 3,712,706 discloses various scientific principles and techniques for ruling a master.

The ruling device must be such that a groove uniform in angle and depth is created along its entire length, and that each successive groove also is properly spaced and uniform. The ruling device can be of the type where the cutter is moved while the workpiece remains stationary or, conversely, the workpiece is moved with respect to a stationary, usually a diamond tipped cutter. Further, the ruling device must be capable of accurately indexing to the second and third or more cutting positions different from the initial set of grooves.

The element 20 for the ruled master 21 of FIG. 3 is positioned upon a workpiece support of an appropriate ruling device (schematically at "A" in FIG. 1) and the cutter thereof set to cut a first series of parallel grooves 31, arbitrarily selected, along the axis in the direction of the arrow 32. The cutter has a V-shaped cutting edge of desired pitch and depth.

In accordance with one aspect of the invention, before cutting of the second set of grooves 34, the first set of grooves 31 is filled along the axis 32 with a material of appropriate hardness and machinability to allow a second set of grooves 34 to be cut without interruption, as if the first set of grooves 31 did not exist. This allows the material being removed during cutting to be pushed directly ahead of the cutter instead of into the first set of grooves at each groove intersection, and thereby possibly distorting the intersections. The fill also serves to support the faces of the tetrahedral elements being created and prevents their distortion. Epoxy or curable polyesters can be used as the fill materials. As noted, a second set of grooves 34 is then cut along the axis in the direction of the arrow 35. The remaining fill material (i.e., that portion not at the intersections of the second grooves 34 with the first grooves 31) then is removed. Fill material then is applied to both sets of grooves and 34 prior to the cutting of a third set of grooves. The element 20 (or tool) is then indexed to proper position to cut a third set of grooves. When the cutting of the third set of grooves is complete, all of the fill material is removed and the ruled master 21 is ready for the next step. One suitable material is a casting polyester known as Decra-Coat manufactured by Resco. A suitable epoxy is Hardman No. 8173.

Figure 1:
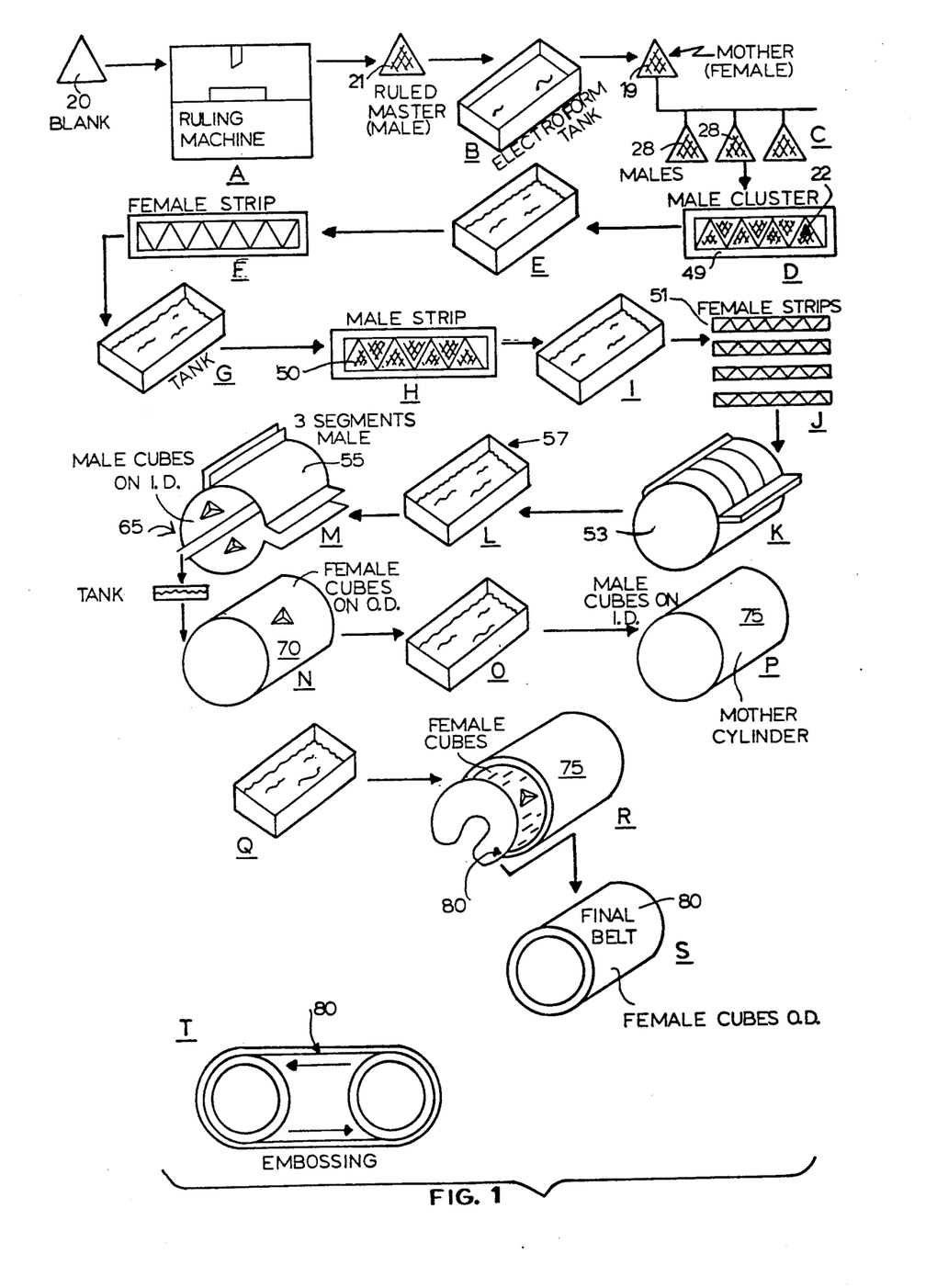
FIG. 1 is a diagrammatic flow chart illustrating the various steps in producing a cylindrical embossing tool in accordance with the present invention.
Figure 1A:
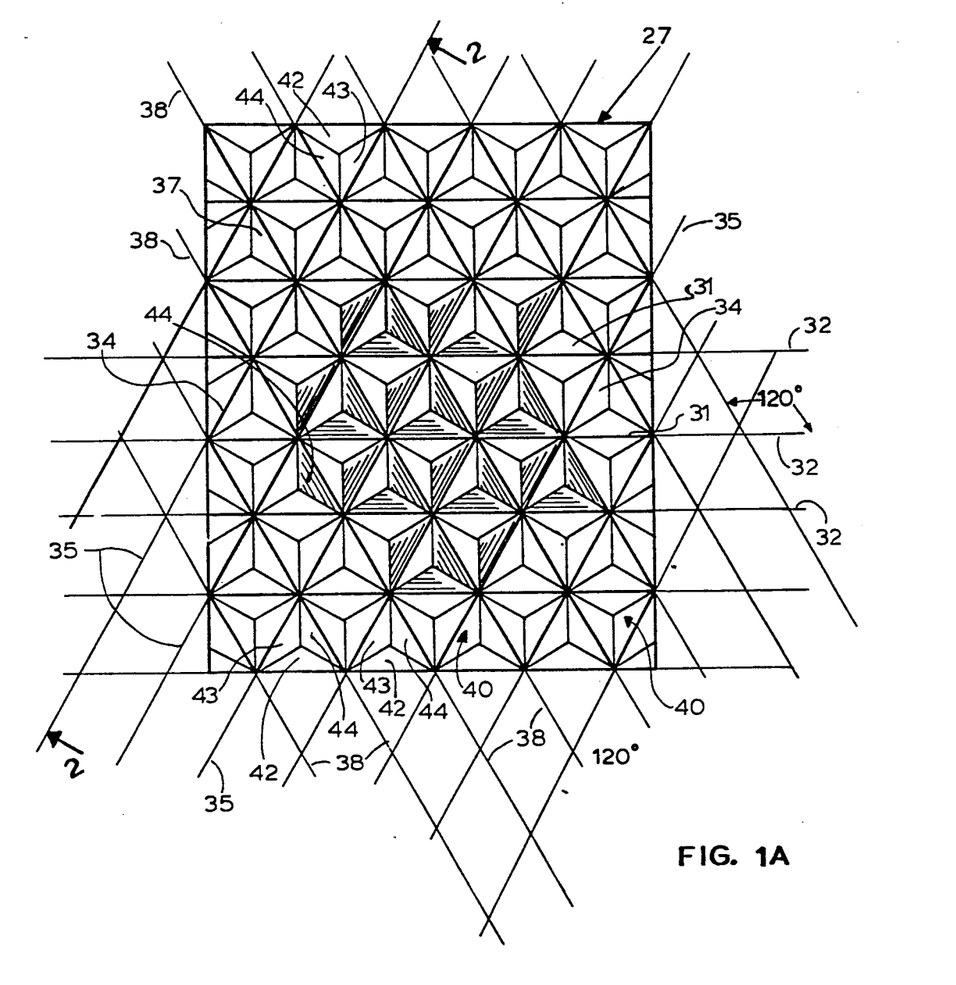
FIG. 1A is a partial top plan view of a completed master for producing an embossing tool for embossing cube-corner sheeting, in which the master is prepared according to the method of the invention.

FIGS. 1A and 2 show a complete ruled master 27 having a square configuration. A first set of grooves 31 was cut along the axes 32, followed by a second set 34 along the axes 35 and a third set of grooves 37 along the axes 38. The intersections of the three grooves creates a base 41 for each of the tetrahedrons or cube-corner elements 40, while the pitch of the cutting tool determines the slope of the three mutually perpendicular faces 42, 43 and 44 of the cube corner elements 40. The intersection of the planes of the faces 42, 43 and 44 is the apex 45 of the tetrahedron 40.

The ruling devices presently available to cut masters to the optical accuracy required for cube-corner retroreflectors are not capable of cutting a single master large enough to be used directly to emboss a web of the desired width and of a length large enough to permit efficient operation. Accordingly, the master such as 21 or 27 must be used to produce copies which can be grouped together to form larger areas until a tool of the desired dimensions is created. Two options are possible at this stage.

Figure 6:
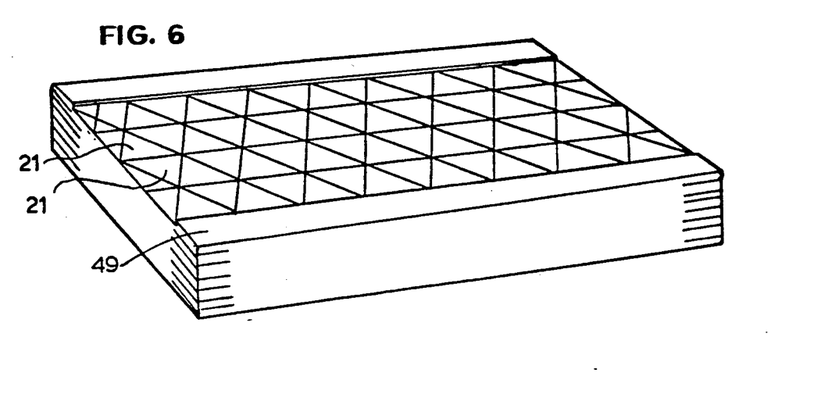
FIG. 6 is a perspective representation of the manner in which triangular masters of the type shown in FIG. 5 can be organized to permit the production of electroform copies of a ruled master.

In the first approach, a number of ruled masters 21 (which may or may not be identical) are produced and then are arranged in a cluster such as 22, 24 or 26, and assembled in a fixture as at 49 (See FIG. 6), and a thick nickel electroform solid copy is made by techniques known to those in the electroforming arts. By the selective shielding of the solid copies, the deposited nickel can be controlled to produce a solid copy without interfaces and of uniform thickness throughout. This solid copy then can be used to generate additional copies needed for the next step, and the clusters 22 can be disassembled and used for other configurations. The first solid copy then will be a female having been formed from a number of the male masters 21.

A second approach employs a single master 21 which is used to generate a mother copy 19 (FIG. 1) which then is replicated to generate a number of electrodeposited nickel copies 28 (shown at C on FIG. 1) and the copies 28 of the master 21 then are arranged in a cluster 22 and assembled into a fixture 49. A solid copy then is made from the clustered copies of the ruled master 21 (steps D, E, F in FIG. 1). Two successive electroform steps are performed so that strip 50 of male cube corner elements corresponding exactly to the ruled master 21 is produced. As noted, the solid copies 28 are used to generate the thin electroform copy or strip 50. The thin strip 50 is then employed to form a plurality of strips 51 of female cube-corner elements as shown at H, I and J of FIG. 1. The strips 51 are then ground on their rear surfaces to a specific thickness to provide the desired flexibility whereby the strips 51 can be formed about an appropriate mandrel 53 (FIG. 1, step K) for succeeding steps. For example, four strips 51, each approximately 5 inches in width and 18 inches long, may be produced from the solid copies 28 and arranged about a cylindrical mandrel 53 so as to provide a cylindrical segment copy 55 (FIG. 1 step M) which is 20 inches wide and 18 inches long. Three cylindrical segment copies 55 then are employed to produce a final embossing tool which is 20 inches wide and approximately 54 inches in circumference. Larger strips and more numerous strips 51 will be used to produce larger tools.

Figure 8:
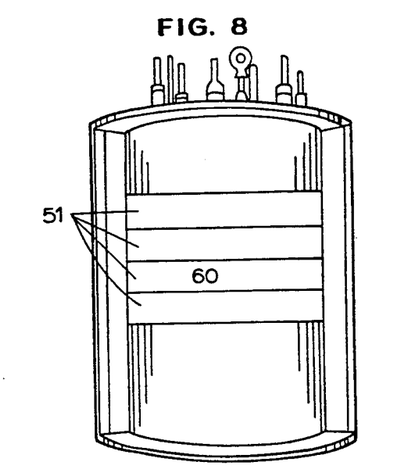
FIGS. 8 to 11 show the progressive positions and size of a shield used during the electroforming creation of the semi-cylindrical segment copies.
Figure 9:
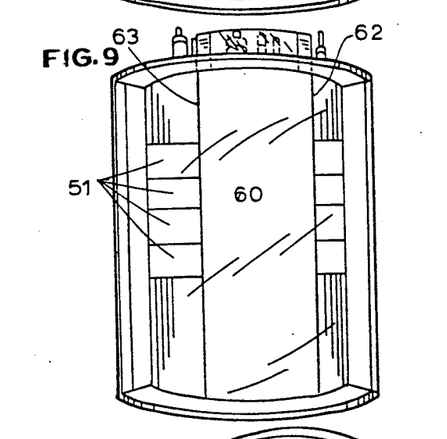
Figure 10:
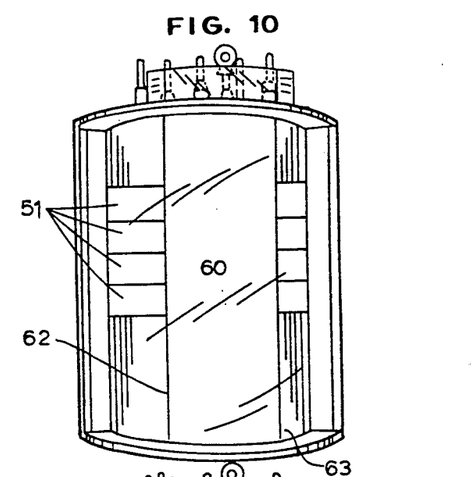
Figure 11:
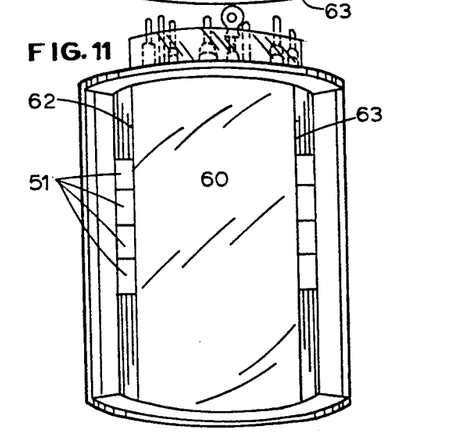

FIGS. 7 to 11 (and steps J-M of FIG. 1) show the method by which the segment copies 55 are generated. Each cylindrical segment copy 55 is about ⅓ of the circumference of the final mother tool for generating the embossing tool. However, different sized segments could be made for specific applications, such as ¼ segments or the like. The segment copy 55 could be made thin and bent into its desired shape by an outer support or it could be produced as a relatively thick member formed in its desired shape in order to retain the optical accuracy and provide strength for later operations. In the latter approach, the female strips 51 are placed about mandrel 53 and both mandrel 53 and strips 51 are placed in the electrodeposition tank 57 (see step L of FIG. 1) adjacent the nickel anodes 61. In such position, the central portion of strips 51 are closer to the anodes 61 than are the ends of strips 51. As a result such ends will be plated to a lesser degree, giving the cylindrical segment copy 55 little strength at its ends. To obviate this problem, a shield 60 (FIG. 7) of nonconductive material (e.g. plastic), is placed between the nickel anodes 61, and the assembled strips 51 on the mandrel 53. The position and width of the shield 60 is controlled so that at the final stages of the electro-deposition most of the nickel ions are directed to the strip ends to increase the thickness of the deposited nickel thereat. FIGS. 8 to 11 show the successive positions of the shield 60 during plating. In FIGS. 8-11, the mandrel 53 is rotated on a vertical axis for representational purposes. The strips 51 are positioned on the mandrel 51 initially and no shield is employed as shown in FIG. 8. The anodes 61 have been omitted from FIGS. 8-11 for the sale of clarity. The anodes 61 normally would be aligned with the strips 51 and exist above the plane of the paper. With such an arrangement, the greatest nickel build up would be about the central portion of the strips 51. As the electro-deposition progresses, it is desirable to direct more and more of the nickel ions toward the strip ends. Accordingly, the shield 60 is placed over the central portion of the strips 51, as is shown in FIG. 9. The shield 60 is supported by two support rods 62 and 63, which also define the extent of the shield 60. Since the nickel ions do not pass through the shield 60, they travel towards the ends of the strips 51 which are furthest away from the electrodes, to build up the thickness of the electro-deposition in such areas. FIGS. 10 and 11 show the further extent of the shield 60. A diagrammatic representation of the shield 60 on successive time periods 2, 3 and 4 is illustrated in plan view in FIG. 12. During period 1, the strip 51 is fully exposed (no shield).

Figures 13, 14, 15:
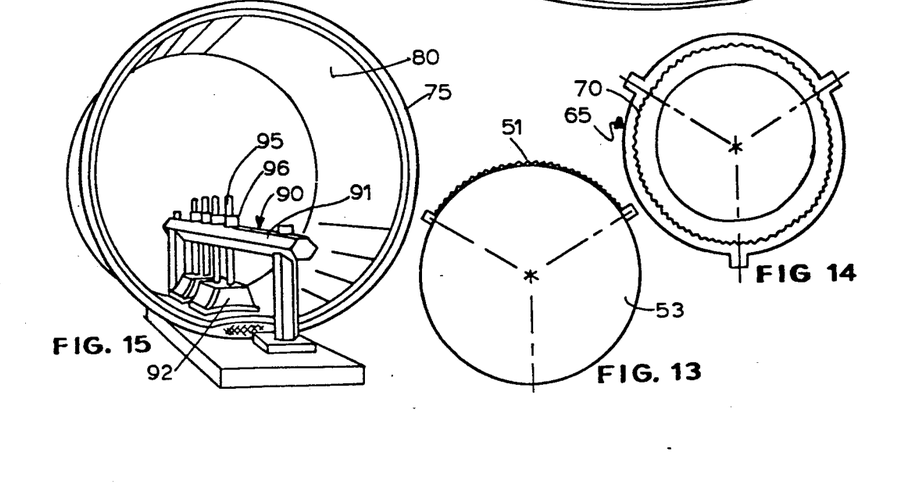
FIG. 13 is a schematic representation of the arrangement of the semi-cylindrical segment copies into a complete cylinder.
FIG. 14 is a schematic representation of the cylinder produced by the semi-cylindrical segment copies.
FIG. 15 is a front perspective view of a suction tool used to remove a completed cylindrical embossing tool from its mother.

When completed, the segment copies 55 (FIG. 1) with their precision patterns on the inside, and each comprising ⅛ of the circumference of a final cylinder, are placed within fixtures (not shown) for support to define a segment cylinder 65 (FIG. 14). Using the assembled segment cylinder 65 as the negative electrode with an accurately positioned nickel anode in the center of the cylinder 65, the segment cylinder 65 will be plated on its inside diameter to generate a thin flexible but solid seamless master cylinder 70 having flash or fins which can be ground off so no stress risers are transferred to the next part. This cylinder then could be used as a model to produce similar cylinders without repeating all of the previous steps (steps A–N in FIG. 1). The segment disassembled into the segment copies 55, leaving the tool master cylinder 70.

The master cylinder 70 now consists of female cubes which are situated on the outside diameter. This cylinder 70 is identical in configuration to that which is required as an embossing tool, however, tools produced by this method (using several segments 55 joined together as a mandrel) have a number of disadvantages. They require an intricate assembly and disassembly of the segment fixture which requires precision alignment. Also of concern is the interface between the thin segments 55 which contain extremely small fissures. Although this discontinuity is almost non-detectable, it causes a difference in the crystalline structure of the metal deposited over it. This change results in stress-risers which become lineal imperfections causing early fatigue failures in parts that will be flexed during embossing.

These problems of assembly and metallurgy are avoided by the present invention. The tool master cylinder 70 will have surface imperfections such as flash, due to the fissures in the mother fixture, removed by grinding. Once this flash is removed, subsequent copies made from such part will not contain stress risers or alterations in the metallurgical structure, although this cylinder 70, when used as a mandrel does have these imperfections.

With proper fixturing (not shown), the tool master cylinder 70 then is rotated during subsequent electroforming, with nickel anodes adjacent its outer surface to form a thick electroform mother cylinder 75, on the order of 0.050" to 0.100", as compared to the tool master cylinder 70 which is of a thickness of only 0.010" to 0.030".

The thick mother cylinder 75 then becomes the negative of a cylindrical embossing tool 80. Both mother cylinder 75 and the cylindrical embossing tool 80 formed on the inner surface thereof are continuous and seamless.

Figure 16:
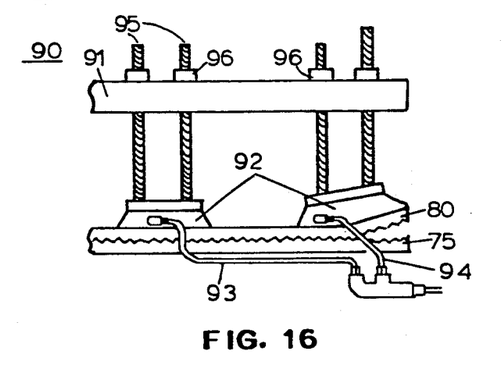
FIG. 16 is a side view of the tool of FIG. 15 with the cylindrical embossing tool removed to better display the construction of such tool.
Figure 17:
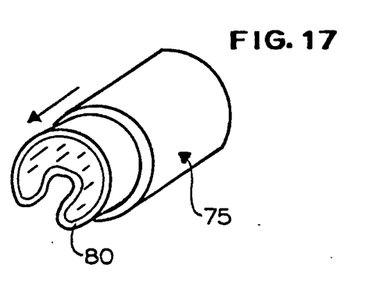
FIG. 17 is a diagrammatic representation of a collapsed cylindrical tool prior to removal from its mother.

The present invention utilizes a novel method to separate the seamless embossing tool 80 from the mother cylinder 75, without damage to either. Normal "sweating" techniques (expanding one cylinder and contracting the other by temperature differential), cannot be employed because of the depth of the male cubes plated into the female counterparts. To provide separation, the inner cylinder is fixtured with a vacuum apparatus 90 (FIGS. 15–17). The vacuum apparatus 90 consists of a tube 91 to which is affixed several hollow suction cups 92. Independently controlled hoses 93 and 94 are affixed one to each cup 92 (see FIG. 16) to create a vacuum. Each cup 92 is secured to the tube 91 by threaded rods 95 and nuts 96. Mechanically raising cup 92 by rotating one nut 96 at one end of one cup, causes the cup to lift the underlying cylindrical tool 80 from the mother 75. This then lifts a portion of the thin and flexible inner tool cylinder 80 away from the rigid outer cylinder 75. Normally, the negative effect of a vacuum in this direction would be cancelled by the intimate contact of the two parts and not allow separation. In this case, the breaking force is initially applied mechanically at the very edges of the cylinders which allows air to enter between the two cylinders. Once the edges are separated, the additional cup or cups 92 that run along the line of separation are mechanically adjusted to continue to apply the vertical vacuum force along a wider path, stripping the inner tool part 80 along this line (FIG. 16). Once the length of the cylinder 80 has been separated along this line, the ends of the inner tool cylinder 80 can be held up mechanically or manually and the vacuum apparatus 90 removed. The thickness of the tool 80 (about 0.010" to 0.030") permits it to flex without damage to the cube corner elements.

The inner cylinder 80 then is totally collapsed, (FIG. 17), either manually or by mechanical means. At this point, a thin protective film such as Mylar is positioned between the two cylinders 75 and 80 to insure removal without digging either surface.

The inner tool cylinder 80 then is pulled clear from the outer cylinder 75 and recovers its shape.

Once removed, the heavy mother cylinder 75 can continue to be used to produce similar embossing tools 80 at a rate of 12 to 48 hours per copy, depending on the plating rate used.

The process disclosed herein can be varied along the various steps if a smaller embossing tool is required or extended if a larger tool is desired. Although the tool 80 is described as a cylinder during its production, because of its ability to flex, it may be employed in other forms. For example, it may be used as a belt having two long sides with short curved ends where it passes over drive rollers (step T of FIG. 1).

It will be understood that while the present invention describes the making of a cylindrical tool for embossing cube corner sheeting, the principles of the invention are applicable to any type of tool in which accuracy of the embossed surfaces are desired for a specific reason, and the noted technique for separation of the cylindrical tool from its mother is applicable to any cylindrical parts formed with an interfering pattern that prevents "sweating" or other simple separation of two seamless cylinders.

While there have been shown and described and pointed out the fundamental novel features of the invention as applied to the preferred embodiments, it will be understood that various omissions and substitutions and changes of the form and details of the devices illustrated and in their operation may be made by those skilled in the art, without departing from the spirit of the invention.

What is claimed is:

1. A thin seamless generally cylindrical flexible electroformed embossing tool, having on its outer surface an optically precise continuous pattern having sharp angles and flatness of faces in certain detail formed thereon by electroforming, for continuous embossing of a web of material with such optically precise pattern, which pattern includes multiples of smaller contiguously arranged optically precise patterns each pattern having its longest dimension of less than one inch.

2. The embossing tool set forth in claim 1 wherein the precise pattern comprises an array of cube-corner type elements.

3. A thin seamless generally cylindrical flexible electroformed embossing tool, having on its outer surface more than one optically precise continuous pattern, each said pattern having sharp angles and flatness of faces in certain detail formed thereon by electroforming, for continuous embossing of a web of material with such optically precise patterns each said pattern including multiples of smaller contiguously arranged optically precise patterns, each said smaller pattern having its longest dimension of less than one inch.

4. The embossing tool set forth in claim 3, wherein said tool is between 0.010″ to 0.030″ in thickness.

5. The embossing tool set forth in claim 3, wherein each precision pattern is defined by a rectangular perimeter.

6. The embossing tool set forth in claim 5, wherein the length of the edge of said rectangular pattern is about 0.16 inch.

7. The embossing tool set forth in claim 5, wherein an edge of each adjacent pattern is positioned to have a different angular position relative to an edge of a contiguous pattern.

8. The embossing tool set forth in claim 3 wherein each of said more than one optically precise patterns comprises an array of cube-corner type elements.

9. The embossing tool set froth in claim 8, wherein the base of each of said cube corner elements comprises an equilateral triangle.

10. The embossing tool set froth in claim 8 wherein said cube-corner elements are defined by series of first parallel grooves located between 0.006″ and 0.012″ to adjacent grooves, and intersecting second and third parallel grooves at 120° measurement.

11. The embossing tool set forth in claim 10, wherein the base of each of said cube-corner elements comprises an isosceles triangle.

* * * * *